Figure 1:
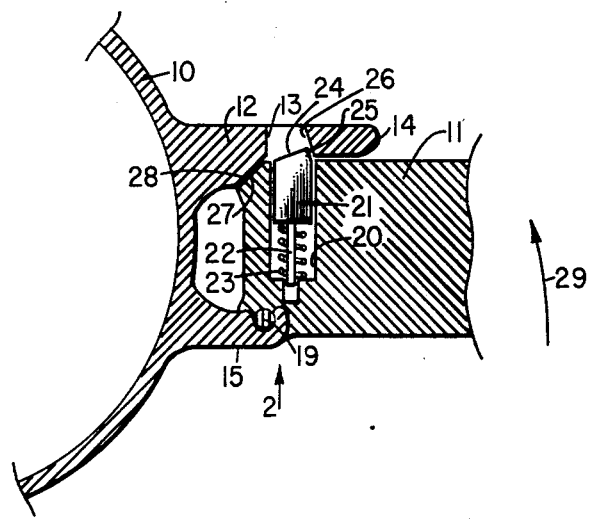

June 28, 1960    H. U. SCHUERCH ET AL    2,942,814
ATTACHMENT APPARATUS
Filed Jan. 9, 1956

INVENTOR.
HANS U. SCHUERCH
GRAHAM S. THOMSON
BY

United States Patent Office 2,942,814
Patented June 28, 1960

2,942,814
ATTACHMENT APPARATUS

Hans U. Schuerch and Graham S. Thomson, Pacific Palisades, Calif., assignors, by mesne assignments, to the United States of America as represented by the Secretary of the Army Filed Jan. 9, 1956, Ser. No. 557,997

1 Claim. (Cl. 244—131)

This invention relates generally to attachment apparatus and more particularly to an improved means for enabling rapid manual attachment and detachment of wings to the fuselage of a missile. While the invention will be described in connection with missile wing attachment problems, the applications of the principles of the invention are by no means limited to this particular field.

In the stockpiling and transporting of guided missiles, many more missiles may be packed in a unit volume if the wings or other control surfaces are removed than is the case when the missiles are assembled. The necessity in wartime of delivering a large number of missiles to any one location rapidly and efficiently is obvious. For these reasons, it is conventional practice to provide quick attaching and detaching means for the missile wings.

One of the primary difficulties in present-day attaching means is the presence of backlash as a result of inability to machine the securing components to a high degree of tolerance. As a result of such backlash, while the wing may be attached to the missile fuselage, there may be present sufficient play to cause serious interference with the structural and aerodynamic characteristics of the missile.

Accordingly, it is a primary object of the present invention to provide an improved attachment means in which substantially all backlash is eliminated and the wing is, for all practical purposes, a rigid integral portion of the missile body.

Other objects are to provide a quick attaching means for securing a wing to a missile fuselage, which is rugged and simple in design, substantially foolproof in operation, and which will enable manual attachment of the wing by unskilled personnel without the necessity of any auxiliary tools or the like.

These and further objects and advantages of this invention are attained by providing a C-shaped flange structure integral with a side portion of the missile fuselage to which the wing is to be attached. The arms of the flange are spaced sufficiently to receive the thickness of the root portion of the wing. The upper portion of the wing root includes pin means positioned for guiding movement in a direction substantially normal to the cord of the root portion. Relatively stiff biasing means is arranged to urge the pin outwardly from the wing root towards the under side of the upper arm of the C-shaped flange on the missile fuselage. This upper arm portion is provided with an opening adapted to receive the pin.

The lower portion of the wing root and the lower arm of the C-shaped flange are provided with interengaging means for rotatively securing the wing root to this lower arm whereby the wing may swing about the lower arm to bring the pin into juxtaposition with the under side of the upper arm. Engaging surfaces are provided on the wing root and fuselage in face-to-face bearing relationship when the wing is swung into position. The pin and side of the opening in the upper arm of the C-shaped flange are provided with camming surfaces inclined such that urging of the pin outwardly by the biasing means, tends to force the engaging surfaces into tight engagement. Any wearing or Brinelling of the engaging surfaces which would normally result in backlash, is accommodated by a continued upward movement or creeping of the pin thereby camming the engaging surfaces together to maintain them in tight engagement.

Figure 2:
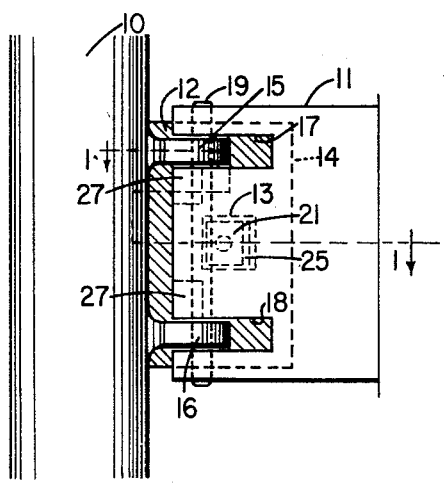

A better understanding of the invention will be had by referring to a preferred embodiment thereof as shown in the accompanying drawings, in which:

Figure 1 is a cross-sectional side view taken in the direction of the section line and arrows 1—1 of Figure 2 of the wing attachment; and Figure 2 is a view looking from the under side of the wing attachment in the direction of the arrow 2 of Figure 1.

Referring to Figure 1, there is shown a portion 10 of a missile fuselage and a root portion 11 of a missile wing secured to the fuselage by the quick attachment means of the present invention. As shown, this quick attachment means includes a generally C-shaped flange structure having an upper flange arm 12 provided with an opening 13 and a beveled tip portion 14. The lower flange arm is in the form of a pair of hooks 15 and 16 as clearly shown in the underside view of Figure 2.

The wing root portion 11 includes a pair of notches 17 and 18 spaced apart along the cord of the wing, adapted to receive the hooks 15 and 16 respectively. A pivot rod or hinge 19 is arranged to traverse the notches in a direction parallel to the cord of the root portion. The hooks 15 and 16, as shown in Figure 1, receive portions of the rod 19 whereby the wing root 11 is rotatably secured to the lower portion of the C-shaped flange. Other interengaging means for rotatively securing the lower portion of the wing root 11 to the lower portion of the fuselage flange may of course be used. The interengaging means illustrated is preferred in that it is a relatively simple matter for an operator to insert the pivot rod 19 into the hook eyes.

The upper portion of the wing root, as shown most clearly in Figure 1, includes a guiding means in the form of a square bore 20 receiving a pin 21. The pin 21 is adapted to move in a direction substantially normal to the cord of the wing root and is provided with a lower stem 22 of reduced diameter leaving an annular space for accommodating a compression spring 23. The compression spring 23 urges or biases the pin 21 in an outward, or upward direction as viewed in Figure 1. When the wing root 11 is in secured position, the opening 13 is arranged to receive the upper end of the pin 21.

As shown clearly in Figure 1 the upper end of the pin 21 is provided with a beveled surface 24 lying substantially at the same angle as the inclined tip 14 of the upper arm 12 of the C-shaped flange. Another side surface 25 of the upper portion of the pin 21 is inclined to provide a camming surface adapted to engage an inclined surface 26 defining a side portion of the opening 13. A pair of engaging or bearing surfaces 27 and 28 at approximately 45° angles with respect to the plane of the wing are provided on the wing root 11 and fuselage flange portion 12 respectively.

In operation, the wing root 11 is attached to the fuselage by first inserting the pivot rod 19 in the hooks 15 and 16 and swinging the wing arcuately upwardly in the direction of the arrow 29. The beveled surface 24 on the upper end of the pin 21 engages the beveled surface 14 on the end portion of the upper flange arm 12 thereby depressing the pin 21 within the bore opening 20. Further swinging movement of the wing brings the bearing surface 27 into face-to-face engagement with the bearing surface 28 and the upper portion of the pin 21 into registry with the opening 13 in the upper flange 12. The pin 21 snaps upwardly into this opening, the camming surface 25 bearing against the inclined surface portion 26 of the inside of the opening 13. The inclination of the surfaces 25 and 26 are such that any wearing or Brinelling between the engaging surfaces 27 and 28, which would normally result in looseness or backlash, will be taken up by the continuous pressure of the pin surface 25 against the cam surface 26 tending to urge the wing root further in the direction of the arrow 29 to maintain the surfaces 27 and 28 in tight engagement.

It will thus be seen that the wing will always be maintained in tight engagement with the fuselage notwithstanding wearing of the engaging surfaces. Furthermore, the construction of the wing attaching means and arrangement of the various components are such that unskilled personnel may readily attach the wing by a single arcuate swinging movement.

Normally, the wing is not attached until the missile is ready for flight; thereafter, there is ordinarily no need for ever detaching the wing. In certain cases where the missile does not contain a warhead, however, or in other instances where it may be desired to detach the wings after they have once been attached, it is a simple matter to depress the pin 21 and swing the wing arcuately downwardly to enable the under portion to be unhooked.

It will be apparent that the attachment apparatus of this invention may be used for other purposes in which it is desired to temporarily secure one member to another. Therefore, modifications and changes within the scope and spirit of the present invention will occur to those skilled in the art. The wing attachment is therefore not to be thought of as limited to the specific embodiment chosen for illustrative purposes.

What is claimed is:

In a means for the rapid attachment of a wing to a missile fuselage, comprising, a C-shaped structure integral with the outer wall of the fuselage, said structure including an upper flange and a pair of spaced lower arms arranged in opposed relation to said upper flange, said upper flange having a top face and a lower bearing face, said lower bearing face having a transverse inclined bearing surface extending across the width of said flange, there being a square opening extending from the inclined bearing surface to the top face of the flange, the opening having an inclined forward wall, said square opening being disposed medially in said flange, said lower arms each having upwardly turned hook portions, the wing having a pair of spaced notches along its inner end, for receiving said lower arms and a square bore extending normally from its upper surface, said bore adapted to register with said square opening in said upper flange when said wing is in attached position in said structure, a hinge pin carried by the lower inner portion of said wing, said pin piercing said wing transversely to extend across the aforesaid notches for engagement into said hooked portions on said lower arms, a square pin slidably mounted in said square bore in said wing, said square pin having a beveled surface along its upper forward edge for engaging said beveled wall in said square opening in said upper flange, a reduced stem portion integral with the lower end of said square pin and a coil spring encircling said stem portion normally urging said square pin upwardly in said bore and into said square opening in said upper flange with a force sufficient to overcome the weight of the wing and to lock said wing in its attached position in the fuselage.

References Cited in the file of this patent

UNITED STATES PATENTS

| | | |
|---|---|---|
| 1,128,573 | Beck et al. | Feb. 16, 1915 |
| 2,519,386 | Loving | Aug. 22, 1950 |
| 2,675,976 | Gerardine | Apr. 20, 1954 |

FOREIGN PATENTS

| | | |
|---|---|---|
| 47,870 | Netherlands | Feb. 15, 1940 |
| 721,530 | Great Britain | Jan. 5, 1955 |